(12) United States Patent
Jung et al.

(10) Patent No.: US 9,100,633 B2
(45) Date of Patent: Aug. 4, 2015

(54) ELECTRONIC DEVICE GENERATING STEREO SOUND SYNCHRONIZED WITH STEREOGRAPHIC MOVING PICTURE

(75) Inventors: Han Jung, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 930 days.

(21) Appl. No.: 13/299,220

(22) Filed: Nov. 17, 2011

(65) Prior Publication Data
US 2012/0127264 A1 May 24, 2012

(30) Foreign Application Priority Data

Nov. 18, 2010 (KR) .......... 10-2010-0114938
Nov. 15, 2011 (KR) .......... 10-2011-0118634

(51) Int. Cl.
*H04N 13/00* (2006.01)
*H04S 7/00* (2006.01)

(52) U.S. Cl.
CPC .............. *H04N 13/0007* (2013.01); *H04S 7/30* (2013.01); *H04S 2400/11* (2013.01); *H04S 2420/01* (2013.01)

(58) Field of Classification Search
CPC .................................................... H04N 13/00
USPC .......................................................... 348/42
See application file for complete search history.

(56) References Cited

U.S. PATENT DOCUMENTS

| 2010/0118201 A1 | 5/2010 | Jeong et al. | |
|---|---|---|---|
| 2011/0032341 A1* | 2/2011 | Ignatov et al. | 348/51 |
| 2013/0010969 A1* | 1/2013 | Cho et al. | 381/17 |

FOREIGN PATENT DOCUMENTS

| EP | 2247116 A2 | 11/2010 |
|---|---|---|
| JP | 52-54401 A | 5/1977 |
| JP | 5-300419 A | 11/1993 |
| JP | 2001-326990 A | 11/2001 |
| WO | WO 02/41664 A2 | 5/2002 |

* cited by examiner

*Primary Examiner* — Sath V Perungavoor
*Assistant Examiner* — Jeffery Williams
(74) *Attorney, Agent, or Firm* — Birch, Stewart, Kolasch & Birch, LLP

(57) ABSTRACT

An electronic device including a receiver configured to receive a stereoscopic moving image including a plurality of frames; a controller configured to obtain a change in depth information of at least one object included in the stereoscopic moving image and to produce a sound zooming factor reflecting the obtained change in depth information; and an audio processor configured to apply the produced sound zooming factor to a sound signal corresponding to at least one speaker of a plurality of speakers outputting sound signals for the stereoscopic moving image.

19 Claims, 24 Drawing Sheets (a) Left image　　　　　　　　(b) Right image (a) Left image  (b) Right image (a) Depth map for previous frame (b) Depth map for current frame

FIG. 14

(a) Group of speakers selectable in 5.1 channel stereo sound system

| Front Left<br>Rear Left | Center<br>Woofer | Front Right<br>Rear Right |
|---|---|---|

(b) Speakers selectable in stereo sound system arranged in 3X3 matrix pattern

| SPEAKER11 | SPEAKER12 | SPEAKER13 |
|---|---|---|
| SPEAKER21 | SPEAKER22 | SPEAKER23 |
| SPEAKER31 | SPEAKER32 | SPEAKER33 |

(a) Depth map for previous frame (b) Depth map for current frame (a) Depth map for
previous frame (b) Depth map for
current frame (a) Left image (b) Right image Horizontal moving of object (a) Previous frame    (b) Current frame

ELECTRONIC DEVICE GENERATING STEREO SOUND SYNCHRONIZED WITH STEREOGRAPHIC MOVING PICTURE

CROSS-REFERENCE TO A RELATED APPLICATION

This application claims priority to Korean Patent Application No. 10-2010-0114938 filed on Nov. 18, 2010, and Korean Application No. 10-2011-0118634 filed on Nov. 15, 2011 in Korea, the entire contents of which is hereby incorporated by reference in its entirety.

BACKGROUND OF THE INVENTION

1. Field of the Invention

The embodiments of the present invention are directed to an electronic device that can generate stereo sound synchronized with a stereoscopic moving picture, and more specifically to an electronic device that can generate in real time stereo sound synchronized with a stereoscopic moving picture providing feelings of distance, space, and direction by using various information obtained during the course of processing the stereoscopic moving picture.

2. Discussion of the Background Art

With the development of storage and audio coding technologies, various media and audio systems have been emerging that may provide multi-channel stereo sound in addition to existing mono and two-channel stereo sound.

Among them, a Dolby AC-3 surround stereo sound system includes five speakers including central, front and left, front and right, rear and left, and rear and right speakers, and a central sub-woofer for bass, and outputs 5.1 channel sound data.

Coded AC-3 data may be reproduced in mono, stereo, Dolby matrix, and 5 or 5.1 channel digital surround depending on decoding methods. AC-3 recording is generally used for movies and American HDTVs and DVDs adopt AC-3 audios.

DTSs stand for digital theater systems and are multi-channel surround coding technologies developed in 1993 for purposes of use in music or moves.

Due to having a high and flexible compression algorithm, the DTS may perform 24 bit quantization with maximum frequency up to 192 kHz and may nearly perfectly reproduce original sound compared to general CD (Compact Disc) recording schemes, such as PCM (Pulse Code Modulation) coding (44.1 kHz, 16 bit). As the movie "Avatar" has a big hit, a number of 3D movies are being produced and 3D televisions for enjoying 3D videos at home.

In 3D movies, viewers primarily feel visual 3D effects and 3D effects are needed for sound as well. However, there are no systems that can synchronize images with sound so that it is manually performed to insert 3D sound effects into large-size image data.

Moreover, although processed separately in 5.1 or 6.1 channels, sound sources recorded in stereo may merely provide left and right sound effects. Particularly, for stereoscopic moving pictures, the sound sources do not interact with front and rear stereoscopic images, thus deteriorating reality effects.

SUMMARY OF THE INVENTION

The embodiments of the present invention provide an electronic device that can generate stereo sound synchronized with a stereoscopic moving picture.

According to an embodiment of the present invention, an electronic device may include a receiver, a controller, and an audio processor.

The receiver may receive a stereoscopic moving image including a plurality of frames. The controller may obtain a change in depth information of at least one object included in the stereoscopic moving image and to produce a sound zooming factor reflecting the obtained change in depth information. The audio processor may apply the produced sound zooming factor to a sound signal corresponding to at least one speaker of a plurality of speakers outputting sound signals for the stereoscopic moving image.

According to an embodiment of the present invention, an electronic device may include a receiver, a controller, and an audio processor.

The receiver may receive a stereoscopic moving picture including a plurality of frames. The controller may generate a histogram for a depth map for a current frame in the stereoscopic moving picture and produces a sound zooming factor based on a peak value of the histogram. The audio processor may apply the produced sound zooming factor to a sound signal corresponding to at least one speaker of a plurality of speakers outputting sound signals for the stereoscopic moving picture.

According to an embodiment of the present invention, an electronic device may include a receiver, a controller, and an audio processor.

The receiver may receive a stereoscopic moving picture including a plurality of frames. The controller may calculate a summed depth value by summing depth values for a plurality of pixels in each of a plurality of pixel lines along a first axis direction in a depth map for a current frame, and to produce a sound zooming factor in consideration of a maximum summed depth value for the current frame in the first axis direction of the depth map. The audio processor may apply the produced sound zooming factor to a sound signal corresponding to at least one speaker of a plurality of speakers outputting sound signals for the stereoscopic moving picture.

According to the embodiments of the present invention, an electronic device may easily produce a sound zooming factor of a stereoscopic image including an object approaching a camera or retreating from the camera, and may easily generate stereo sound synchronized with a stereoscopic moving picture using the sound zooming factor.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 14A and 14B are views for describing a method of applying a sound zooming factor by the stereo sound generating method shown in FIG. 13;

DESCRIPTION OF THE EMBODIMENTS OF THE INVENTION

Figure 1:
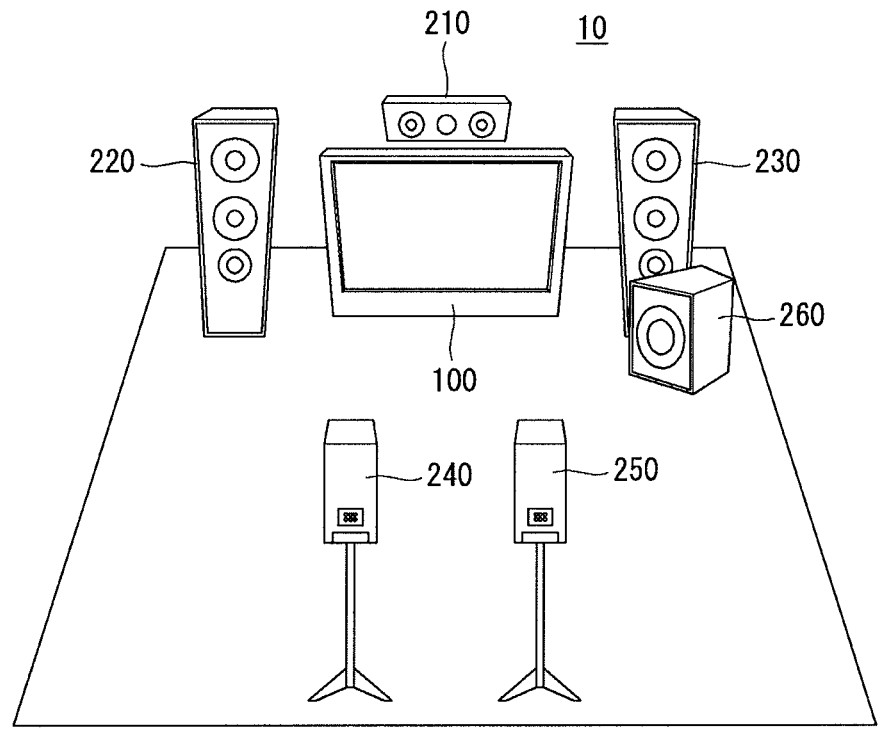
FIG. 1 is a view illustrating a configuration of a multimedia system according to an embodiment of the present invention.

For better understanding of the embodiments, detailed description is made with reference to the drawings. As used herein, when a first component "transmits" or "transfers" data or signals to a second component, the first component may transmit or transfer the data or signals to the second component directly or via at least one other component.

As used herein, the terms "module" and "unit" may be used together for convenience of description and do not provide meanings or functions distinguished from each other. The embodiments of the present invention will be apparent from the detailed description taken in conjunction with the drawings.

Hereinafter, embodiments of the present invention will be described with reference to the drawings, wherein the same reference numerals may be used to denote the same or substantially the same elements throughout the drawings and the specification. Known functions or constructions associated with the embodiments are excluded from the detailed description when such description is determined to make the gist of the embodiments unnecessarily unclear.

FIG. 1 is a view illustrating a configuration of a multimedia system 10 according to an embodiment of the present invention, wherein the multimedia system 10 may provide a stereoscopic moving picture and stereo sound synchronized with the stereoscopic moving picture.

Referring to FIG. 1, the multimedia system 10 includes an electronic device 100 and a plurality of speakers 210 to 260 for outputting sound signals from the electronic device 100. According to an embodiment, the plurality of speakers 210 to 260 may create 5.1 channel sound.

However, the embodiments of the present invention are not limited thereto. According to embodiments, the multimedia system 10 may further include other elements than the elements shown in FIG. 1 or may exclude some elements from FIG. 1.

Hereinafter, the elements in FIG. 1 are described in greater detail. The electronic device 100 displays stereoscopic moving picture. The electronic device 100 creates stereo sound synchronized with the stereoscopic moving picture based on a depth map for the stereoscopic moving picture and outputs the created stereo sound through the sound system.

As used herein, the "synchronizing the stereo sound with the stereoscopic moving picture" means controlling sound output through the plurality of speakers included in the stereo sound system in consideration of approach or retreat of an object included in an image output through the 3D display 120 (see FIG. 2) unlike an existing system simply outputting sound signals through a stereo sound system. The depth map for the stereoscopic moving picture may be provided separately from the stereoscopic moving picture or may be generated based on left and right images included in the stereoscopic moving picture.

The electronic device 100 may produce or extract parameters for controlling sound output through the stereo sound system by analyzing the depth map itself or by generating and analyzing a histogram for the depth map. As used herein, a "parameter for controlling a magnitude of sound output through the stereo sound system" is referred to as a sound zooming factor.

The electronic device 100 may produce a sound zooming factor for each of the plurality of speakers included in the stereo sound system or may produce a sound zooming factor that jointly applies to the plurality of speakers.

The electronic device 100 may apply the produced sound zooming factor to some of the speakers 210 to 260. The plurality of speakers 210 to 260 may output stereo sound synchronized with the stereoscopic moving picture output from the electronic device 100.

As shown in FIG. 1, an example of outputting stereo sound using a 5.1 channel sound system is described. When an object included in a moving picture output through the 3D display 120 approaches a center of the screen, the electronic device 100 produces a sound zooming factor for increasing a magnitude of sound output through the central speaker 210 which corresponds to the center of the screen and applies the produced sound zooming factor to the central speaker 210.

Then, the central speaker 210 may output sound that has a higher magnitude than a magnitude of sound that would be otherwise output. When an object included in an image output through the 3D display 120 retreats from a left region of the screen, the electronic device 100 produces a sound zooming factor for decreasing a magnitude of sound output from the speakers 220 and 240 corresponding to the left region and applies the produced sound zooming factor to the speakers 220 and 240.

Then, the speakers 220 and 240 each output sound whose magnitude is lower than a magnitude of sound that would be otherwise output. Hereinafter, a method of producing a sound zooming factor for generating stereo sound by the electronic device 100 and examples of applying the sound zooming factor are described in greater detail with reference to FIGS. 2 to 24.

Figure 2:
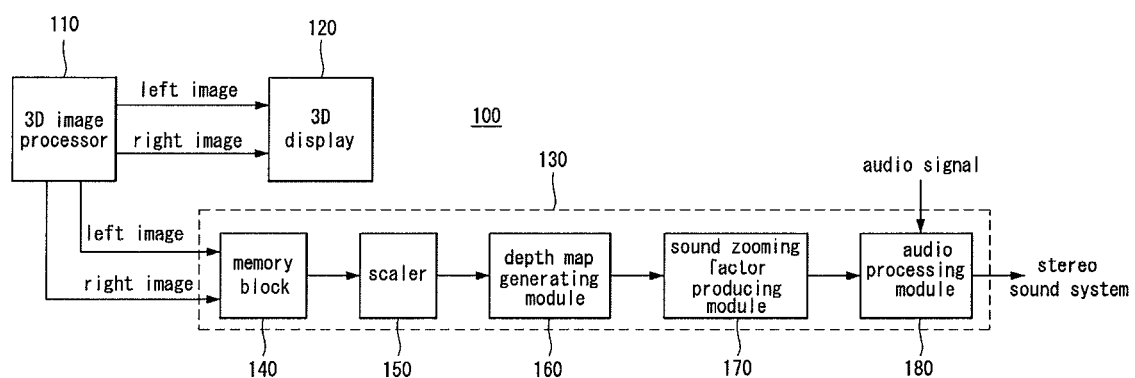
FIG. 2 is a block diagram illustrating an electronic device according to an embodiment of the present invention.

FIG. 2 is a block diagram illustrating an electronic device 100 according to an embodiment of the present invention, wherein the electronic device 100 may create stereo sound synchronized with a stereoscopic moving picture.

Referring to FIG. 2, the electronic device 100 may be implemented as a TV having a 3D display 120. According to embodiments, the electronic device having a 3D display may include a laptop computer or a mobile terminal.

However, the embodiments of the present invention are not limited thereto. According to an embodiment, when the electronic device 100 is implemented as a small electronic device, such as a laptop computer or mobile terminal, a stereo sound system connected to the electronic device 100 may be embodied as a headset or earphone supporting multi-channel sound but not as large-size speakers as shown in FIG. 1. According to an embodiment, the electronic device 100 may be implemented as an image replay device that does not include a display and instead supplies moving pictures to a separate display.

An example of such a device includes a Blu-ray® disc player. However, the embodiments of the present invention are not limited thereto. Referring to FIG. 2, the electronic device 100 includes a 3D image processor 110, a 3D display 120, and an audio processor 130.

According to embodiments, the electronic device 100 may further include other elements or may exclude some elements from FIG. 2. According to an embodiment, the audio processor 130 may include more or less elements than the elements shown in FIG. 2. The elements shown in FIG. 2 are described in further detail. The 3D image processor 110 outputs left and right images for forming a stereoscopic image to the 3D display 120 and the audio processor 130.

The 3D image processor 110 may process a received 3D stereoscopic image to fit an output format for the electronic device 100 or may receive a 2D image and convert the 2D image into a 3D stereoscopic image. The 3D display 120 may output the left and right images.

The images output through the 3D display 120 are recognized as a stereoscopic moving picture by a user due to binocular disparity of the user's eyes.

The binocular disparity refers to a phenomenon in which a slight difference occurs between images respectively viewed by a user's left and right eyes since the left and right eyes are apart from each other by about 6.5 cm. By such a difference, the user can feel a 3D effect. As a principle of implementing a stereoscopic image, an object is image captured by two or more cameras that are spaced apart from each other by a predetermined distance to generate left and right images to which binocular disparity applied. The left and right images are respectively viewed by the user's left and right eyes, thus resulting in the user feeling a 3D effect.

The audio processor 130 receives an audio signal that matches the stereoscopic moving picture. Further, the audio processor 130 may receive the left and right images and produce a sound zooming factor for controlling a magnitude of the received audio signal.

Then, the audio processor 130 applies the produced sound zooming factor to the received audio signal and outputs a resultant signal through the stereo sound system.

According to an embodiment, the audio signal output from the audio processor 130 may be amplified by an amplification system and then output through the stereo sound system. The audio processor 130 includes a memory block 140, a scaler 150, a depth map generating module 160, a sound zooming factor producing module 170, and an audio processing module 180. The memory block 140 buffers left and right images output from the 3D image processor 110.

According to an embodiment, the memory block 140 may include a memory for storing the left and right images and a memory controller for controlling data storage and output operations of the memory. The scaler 150 scales the left and right images output from the memory block 140 to comply with a resolution of the 3D display 120.

Based on the left and right images output from the scaler 150, the depth map generating module 160 may produce a sound zooming factor for controlling a magnitude of an audio signal output to the stereo sound system.

Based on depth maps for previous and current frames of the stereoscopic moving picture, the sound zooming factor producing module 170 obtains a change in depth information of the current frame with respect to the previous frame and reflects the obtained depth information change, thereby producing a sound zooming factor.

According to embodiments, the sound zooming factor producing module 170 may obtain the change in depth information based on the depth maps themselves for the previous and current frames or may first generate histograms for the depth maps for the previous and current frames and then obtain a change in the depth information based on the generated histograms. The sound zooming factor producing module 170 may produce a sound zooming factor based on depth information obtained based on the depth map for the current frame.

According to embodiments, the sound zooming factor producing module 170 may produce the sound zooming factor by analyzing the depth map itself for the current frame or may first generate a histogram for the depth map for the current frame and then produce a sound zooming factor based on the generated histogram. The audio processing module 180 applies the produced sound zooming factor to the received audio signal and outputs a resultant signal through the stereo sound system.

Then, the stereo sound system may output not an original audio signal but an audio signal reflecting the depth change of the object displayed through the 3D display 120. Although the audio processor 130 shown in FIG. 2 generates the depth map of the stereoscopic moving picture based on the left and right images of the stereoscopic moving picture, according to an embodiment, the depth map for the stereoscopic moving picture may be previously generated and provided to the audio processor 130.

The audio processing module 180 analyzes sound reaching a user at different angles and creates and synthesizes a listening cue, for example, an interaural intensity difference (IID)

signal, an interaural time difference (ITD) signal, or an outer ear effect that filters the reached sound, thereby generating stereo sound.

In the course, a head related transfer function may be used. The head related transfer function is a function that models a path along which sound is transferred from a sound source to an eardrum and varies with a relative location between the sound source and a user's head.

In most cases, a 3D screen or monitor is arranged at a front of a user, some speakers at a center and front left and right sides of the user, and some speakers at rear left and right sides of the user. The audio processing module 180 may obtain a stereo sound effect by controlling the output of the sound signal output through the plurality of speakers and may further obtain a stereo sound effect in synchronization with the stereoscopic moving picture by applying the sound zooming factor to the sound signal.

According to embodiments, the elements of the audio processor 130 shown in FIG. 2 each may be implemented in independent hardware, or some or all of the elements of the audio processor 130 may be implemented in software.

Figure 3:
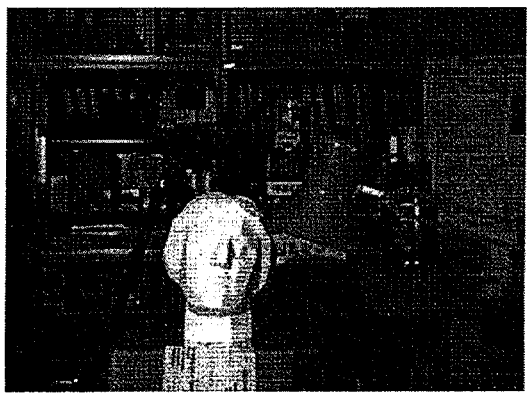
FIGS. 3A and 3B respectively illustrate left and right images in a stereoscopic moving picture.
Figure 3:
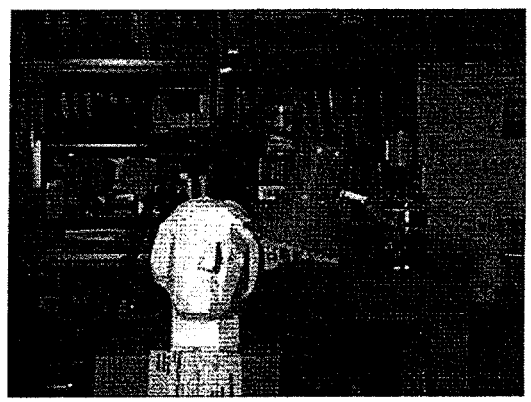
Figure 4:
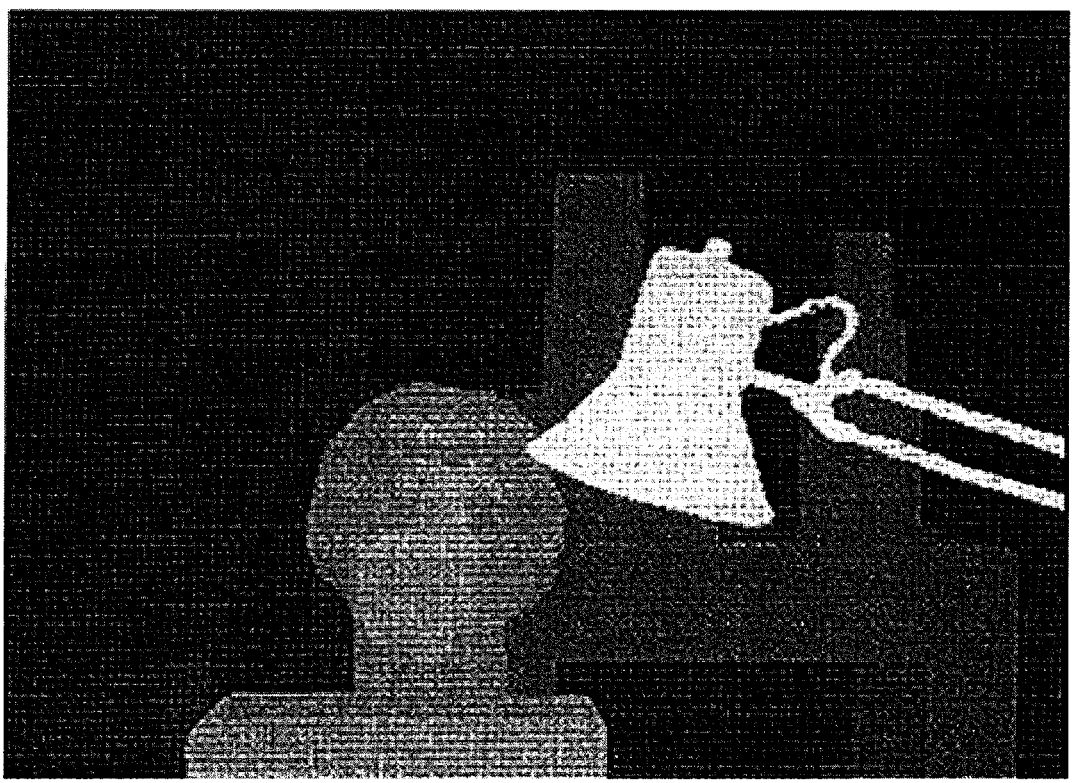
FIG. 4 illustrates an exemplary depth map extracted from the left and right images shown in FIG. 3.

FIGS. 3A and 3B respectively illustrate left and right images in a stereoscopic moving picture. FIG. 4 illustrates an exemplary depth map extracted from the left and right images shown in FIG. 3. Referring to FIG. 4, a desk lamp located near a camera, i.e., a user watching the television, appears brighter than objects positioned behind the desk lamp. In the exemplified depth map, the brighter object refers to being positioned closer to the camera.

Figure 5:
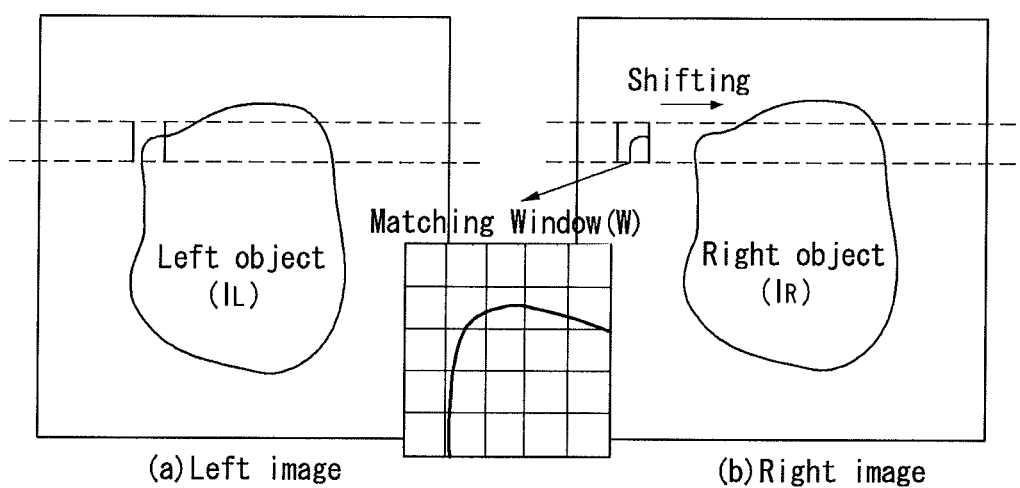
FIG. 5 is a view illustrating a method of generating a depth map using binocular disparity for left and right images in a stereoscopic moving picture.

FIG. 5 is a view illustrating a method of generating a depth map using binocular disparity for left and right images in a stereoscopic moving picture.

Specifically, the depth map generating method illustrated in FIG. 5 represents a region-based method. The region-based method finds corresponding points for matching between the left and right images on a per-region basis.

For example, the region-based method matches the left and right images to each other for each region using a window having a predetermined size and generates a depth map by a process of extracting a correlation depending on a size of a local region.

The window used for matching may be properly sized in consideration of accuracy of matching and a calculation speed for matching. FIG. 5 represents that when the left and right images are assumed to be horizontal, the depth map generating module 160 of the electronic device 100 may find a region having a highest correlation while shifting on the right image in the right direction part of the left image, which has a size of the matching window, thereby predicting a disparity.

In a stereoscopic image (for example, the left and right images), a disparity appears small for an object away from the camera and appears large for an object near the camera. The depth map, also referred to as a "disparity map", is one representing such disparity according to brightness levels.

As a consequence, in the depth map, an object close to the camera appears bright, and as moves away from the camera, the object appears dark, thereby enabling distance information of the object to be known. Other than the region-based method described in connection with FIG. 5, the depth map generating module 160 may also generate a depth map of a stereoscopic moving picture based on left and right images using a feature-based method or pixel-based method. However, the embodiments of the present invention are not limited thereto.

Figure 6:
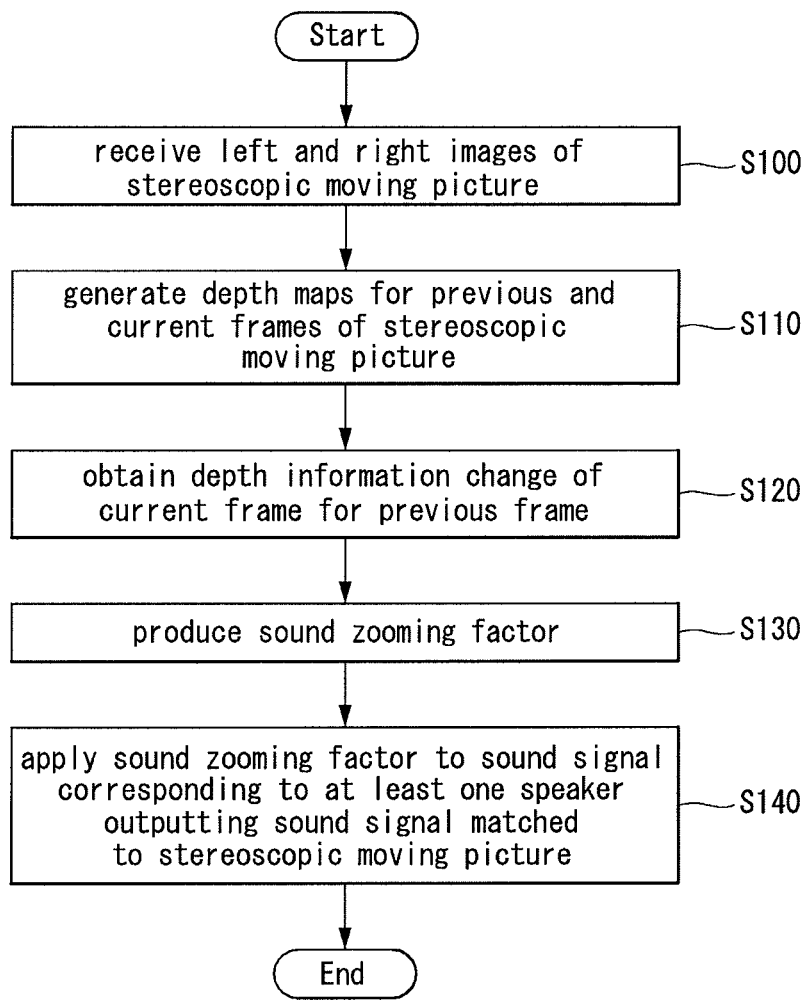
FIG. 6 is a flowchart illustrating a method of generating stereo sound synchronized with a stereoscopic moving picture by an electronic device according to an embodiment of the present invention.

FIG. 6 is a flowchart illustrating a method of generating stereo sound synchronized with a stereoscopic moving picture by an electronic device according to an embodiment of the present invention.

Hereinafter, the stereo sound generating method is described with reference to relevant drawings. According to an embodiment, the process shown in FIG. 6 is performed by the audio processor 130 of the electronic device 100. The audio processor 130 of the electronic device 100 receives left and right images of a stereoscopic moving picture (S100).

The left and right images, as shown in FIG. 2, are output from the 3D image processor 110 to the depth map generating module 160 via the memory block 140 and the scaler 150. Then, the depth map generating module 160 generates depth maps for previous and current frames of the stereoscopic moving picture based on the left and right images (S110).

The generated depth maps for the previous and current frames are output to the sound zooming factor producing module 170. Based on the depth maps for the previous and current frames, the sound zooming factor producing module 170 obtains a change in depth information of the current frame with respect to the previous frame (S120).

Then, the sound zooming factor producing module 170 produces a sound zooming factor reflecting the obtained change in the depth information (S130). The produced sound zooming factor is output to the audio processing module 180. Then, the audio processing module 180 receives a sound signal corresponding to at least one speaker included in the stereo sound system and applies the produced sound zooming factor to the received sound signal (S140), then outputs a resultant signal through the stereo sound system.

Then, the stereo sound system may output stereo sound reflecting the depth information of the object included in the stereoscopic moving picture (for example, in synchronization with the stereoscopic moving picture).

Figure 7:
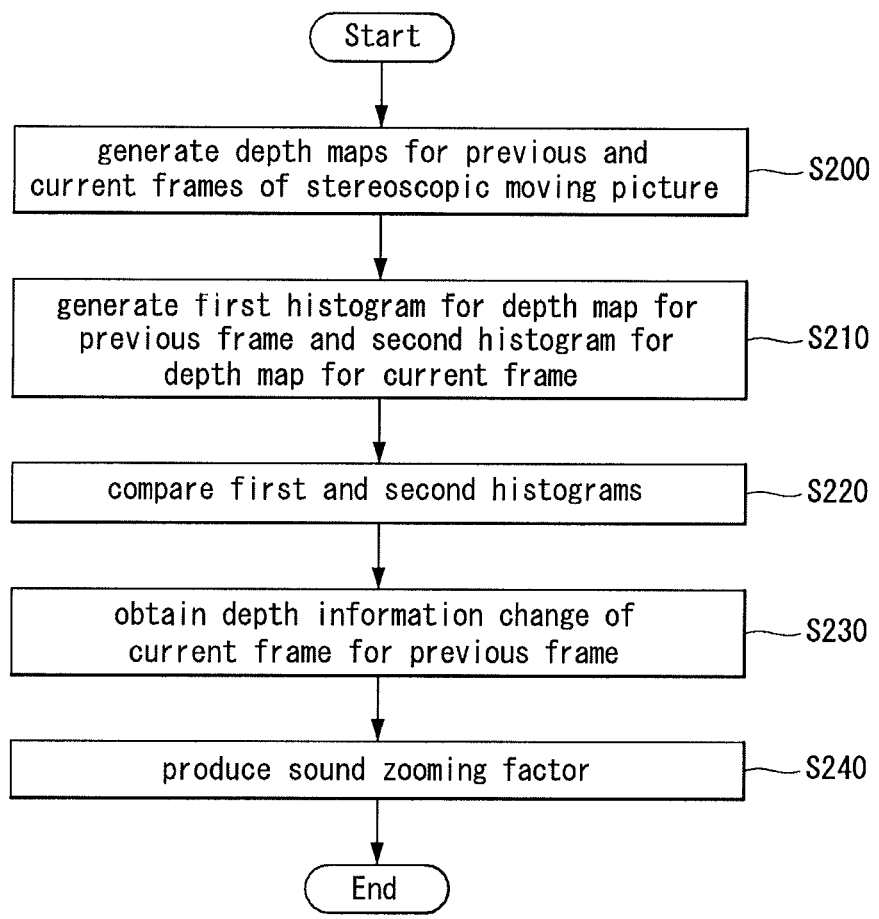
FIG. 7 is a flowchart illustrating an example of the stereo sound generating method shown in FIG. 6.

FIG. 7 is a flowchart illustrating an example of the stereo sound generating method shown in FIG. 6. Hereinafter, the sound generating method is described with reference to relevant drawings. In the electronic device 100, the depth map generating module 160 of the audio processor 130 generates depth maps for previous and current frames based on left and right images of a stereoscopic moving picture (S200).

The generated depth map is output to the sound zooming factor producing module 170. Then, the sound zooming factor producing module 170 generates a first histogram for the depth map for the previous frame and a second histogram for the depth map for the current frame (S210).

Figure 8:
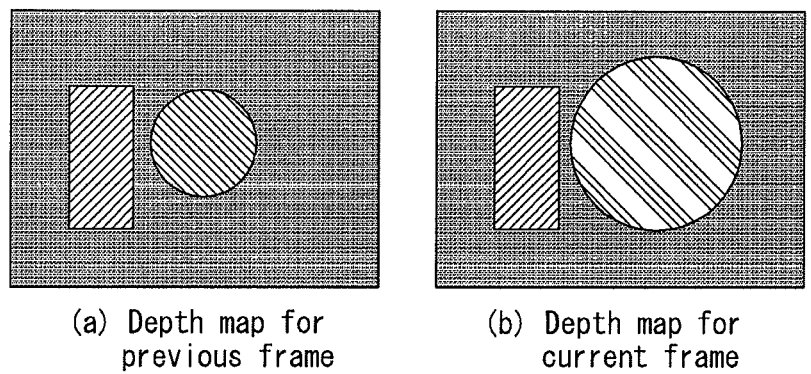
FIG. 8 illustrates exemplary changes in depth maps for an object approaching a camera.
Figure 9:
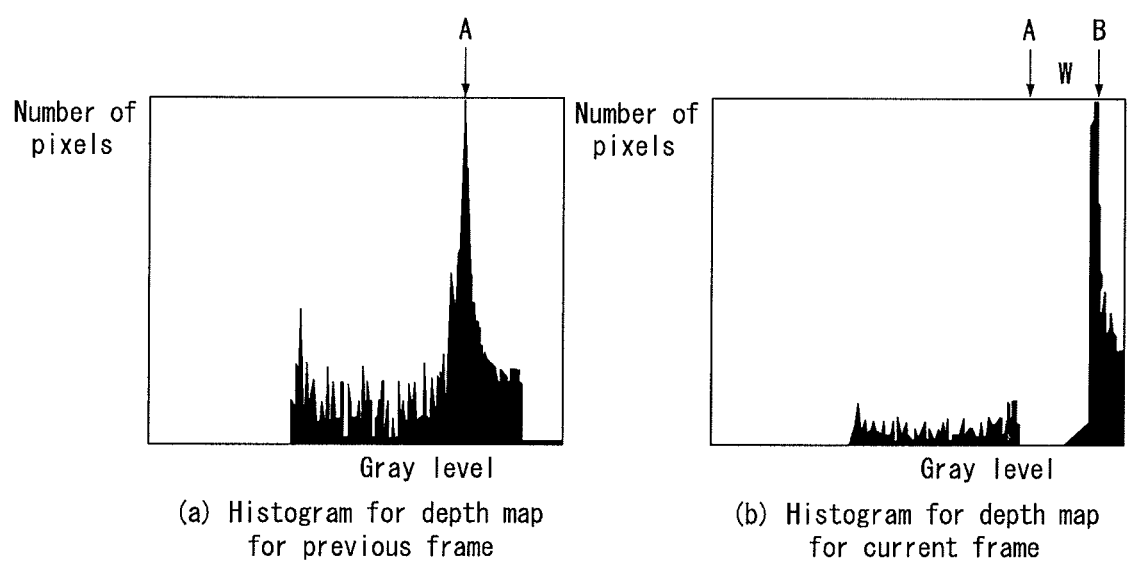
FIG. 9 illustrates histograms for the depth maps shown in FIG. 8.

FIG. 8 illustrates exemplary changes in depth maps for an object approaching a camera. FIG. 9 illustrates histograms for the depth maps shown in FIG. 8.

Referring to FIGS. 8A and 8B, as approaching a camera, a sphere becomes larger in size and brighter in brightness. Referring to FIGS. 9A and 9B, in a histogram for a previous frame, a peak is present at position A, and in a histogram for a current frame, the peak shifts by W to position B which corresponds to a brighter depth value.

As the sphere approaches the camera, a distance between the camera and the sphere decreases, so that the sphere becomes brighter, and as shown in FIG. 9B, the number of pixels for the brighter value corresponding to position B is thus increased. In FIG. 9, a horizontal axis of the histogram refers to gray levels that represent values corresponding to distances between the object and the camera.

As the gray level value increases, the object becomes close to the camera which is represented on the depth map with a brighter pixel. A vertical axis of the histogram refers to the number of pixels corresponding to the gray levels in the depth map. Referring back to FIG. 7, the sound zooming factor producing module 170 compares the first histogram with the second histogram (S220) and obtains a change in depth information of the current frame with respect to the previous frame based on a result of the comparison (S230).

For example, when as a result of the comparison between the histograms shown in FIG. 9, the peak shifts from position A to position B, the sound zooming factor producing module 170 may obtain information of the object included in the stereoscopic moving picture approaching the camera. A travelling distance (e.g., a change in depth information) by which the object included in the stereoscopic moving picture approaches or moves away from the camera may be calculated from a difference between the peak points of the histograms for the previous and current frames.

Specifically, the sound zooming factor producing module 170 removes information regarding a stationary part and extracts only information regarding a moving part by subtracting the histogram for the previous frame from the histogram for the current frame, and based on the extracted information, determines the shift of the peak point.

Since in the histogram for the depth map each gray level represents a distance from the camera, a value obtained by subtracting a gray level corresponding to the peak point in the histogram for the previous frame from a gray level corresponding to the peak point in the histogram for the current frame may include information on a change in a depth value of an object included in the stereoscopic moving picture. When obtaining the change in depth information of the current frame with respect to the previous frame, the sound zooming factor producing module 170 produces a sound zooming factor based on the obtained change in depth information (S240).

The produced sound zooming factor is output through the audio processing module 180 and the audio processing module 180 applies the produced sound zooming factor to sound signals output from the plurality of speakers in the stereo sound system, then outputs a resultant signal. Then, the plurality of speakers may output a stereo sound signal synchronized with the stereoscopic moving picture.

Figure 10:
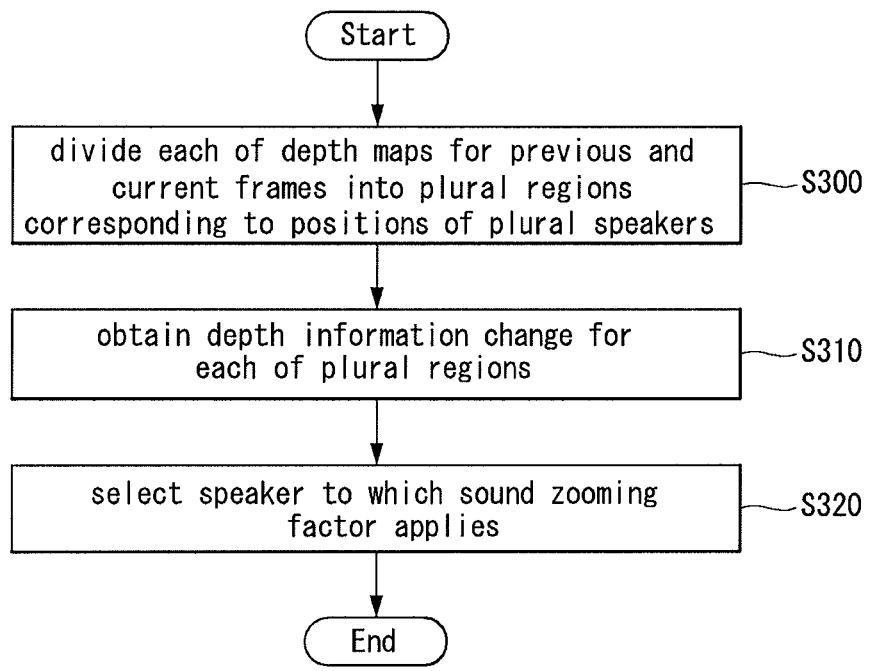
FIG. 10 is a flowchart illustrating an example of the stereo sound generating method shown in FIG. 6.

FIG. 10 is a flowchart illustrating an example of the stereo sound generating method shown in FIG. 6. Specifically, FIG. 10 illustrates a method of selecting a speaker to which a sound zooming factor produced by a method as shown in FIG. 6 applies. Hereinafter, the stereo sound generating method is described with reference to relevant drawings.

The depth map generating module 160 of the audio processor 130 in the electronic device 100 divides each of depth maps for previous and current frames into a plurality of regions corresponding to locations of a plurality of speakers included in a stereo sound system (S300) and then obtains a change in depth information for each of the plurality of regions (S310).

For example, the change in depth information for each of the plurality of regions may be obtained by subtracting a depth value of a corresponding region among a plurality of regions for the previous frame from a depth value of each of a plurality of regions for the current frame. When the change in depth information is obtained, the sound zooming factor producing module 170 selects a speaker to which the sound zooming factor produced based on the obtained change in depth information applies (S320).

Figure 11:
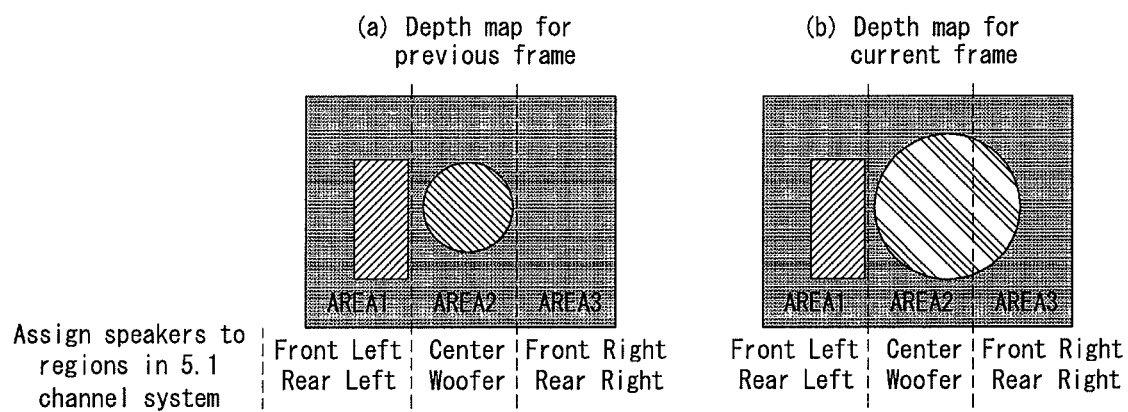
FIG. 11 illustrates an example where the depth maps shown in FIG. 8 are divided into a plurality of regions by the stereo sound generating method shown in FIG. 10.

FIG. 11 illustrates an example where the depth maps shown in FIG. 8 are divided into a plurality of regions by the stereo sound generating method shown in FIG. 10.

Referring to FIG. 11, it can be seen that each of the previous and current frames is divided into a left region, a central region, and a right region that correspond to a plurality of speakers in a 5.1 channel sound system. The left region corresponds to a left and front speaker and a left and rear speaker, the central region to a central speaker and a woofer, and the right region to a right and front speaker and a right and rear speaker. By subtracting a depth value for a region corresponding to the previous frame from a depth value for each of the plurality of regions in the depth map for the current frame, it can be seen that the central region has a largest variation in a depth value.

Then, the sound zooming factor producing module 170 may select the woofer and the central speaker corresponding to the central region as speakers to which the produced sound zooming factor is to apply.

Referring to FIG. 11, magnitudes of sound signals output from the central speaker and woofer increase compared to magnitudes of sound signals that were supposed to be output. Unlike those shown in FIG. 11, when a decrease in a depth value of the central region is large, the sound zooming factor producing module 170 generates a sound zooming factor that reduces a magnitude of sound output through the central speaker and woofer and outputs the generated sound zooming factor to the audio processing module 180. The speaker selection method shown in FIG. 11 may also apply to selecting a speaker to which sound zooming factors generated by stereo sound generating methods to be described below apply.

Figure 12:
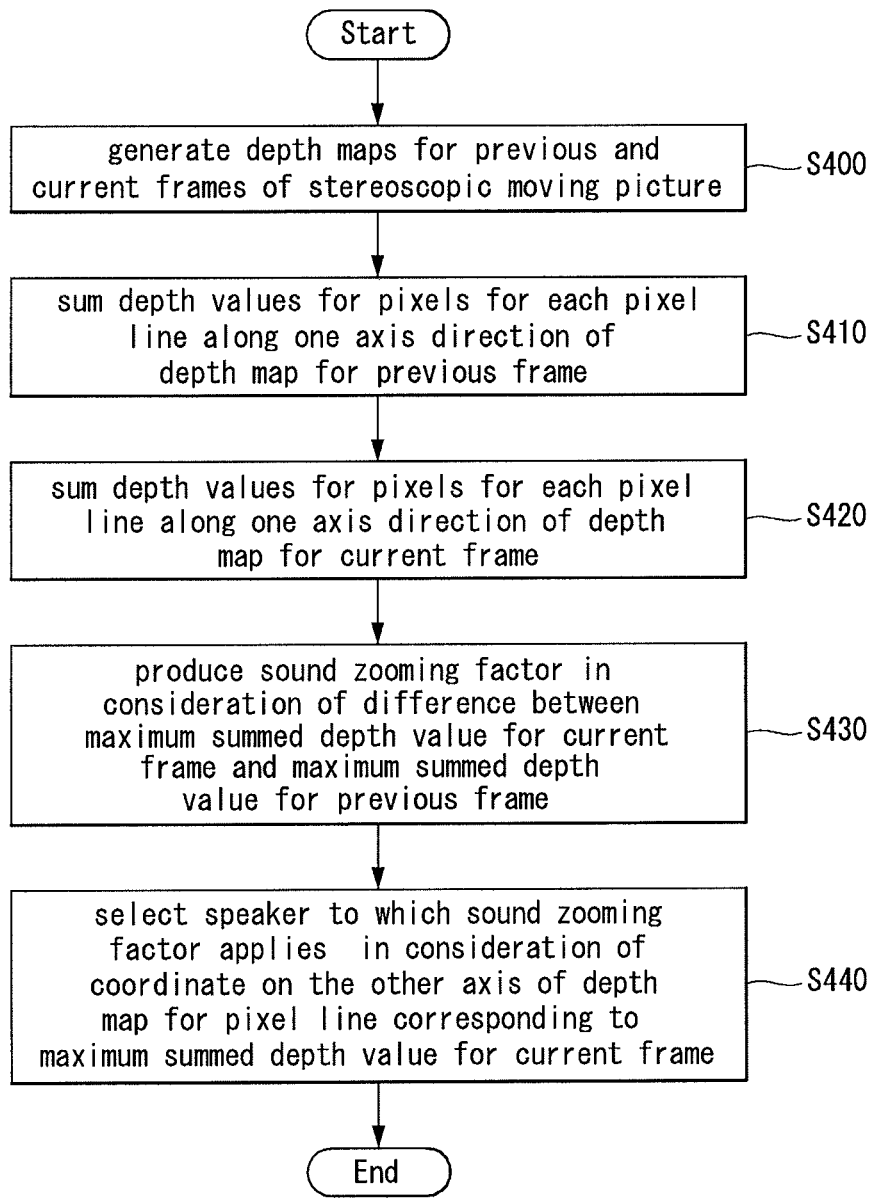
FIG. 12 is a flowchart illustrating an example of the stereo sound generating method shown in FIG. 6.

FIG. 12 is a flowchart illustrating an example of the stereo sound generating method shown in FIG. 6. The stereo sound generating method is described with reference to relevant drawings. The depth map generating module 160 generates depth maps for previous and current frames in a stereoscopic moving picture (S400).

Then, the sound zooming factor producing module 170 sums depth values for pixels of each pixel line along an axial direction in the depth map for the previous frame (S410), and sums depth values for pixels of each pixel line along an axial direction in the depth map for the current frame (S420). Thereafter, the sound zooming factor producing module 170 selects a pixel line having a maximum summed depth value among the pixel lines in the current frame and a pixel line having a maximum summed depth value among the pixel lines in the previous frame, and produces a sound zooming factor in consideration of a difference between the maximum summed depth value for the current frame and the maximum summed depth value for the previous frame (S430).

When the sound zooming factor is produced, the sound zooming factor producing module 170 may select a speaker to which the sound zooming factor is to apply in consideration of a coordinate on another axis in the depth map for a pixel line corresponding to the maximum summed depth value for the current frame (S440). FIGS. 13A and 13B are views for describing the stereo sound generating method shown in FIG. 12.

Figure 13:
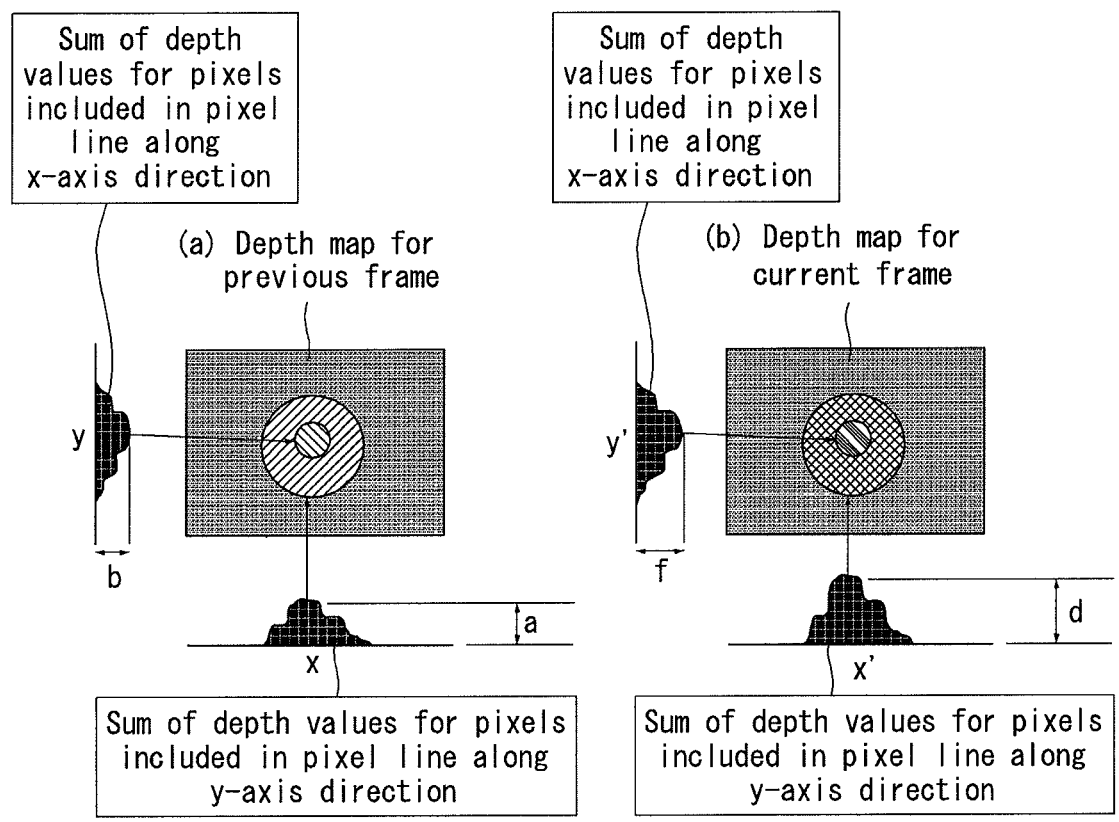
FIGS. 13A and 13B are views for describing the stereo sound generating method shown in FIG. 12.

Hereinafter, the stereo sound generating method shown in FIG. 12 is described with reference to FIG. 13. Referring to FIG. 13, the sound zooming factor producing module 170 sums depth values for pixels in each of pixel lines along a y-axis direction in depth maps for current and previous frames to produce a summed depth value. Then, the sound zooming factor producing module 170 produces a sound zooming factor in consideration of a difference (d−a) between a maximum summed depth value (d) along the y-axis direction in the current frame and a maximum summed depth value (a) along the y-axis direction in the previous frame.

The difference (d−a) between the maximum summed depth values may express a change in a depth value of the current frame with respect to the previous frame. For example, when the difference (d–a) has a positive value, the sound zooming factor producing module 170 determines that the current frame tends to approach the camera compared to the previous frame.

Then, the sound zooming factor producing module 170 may produce a sound zooming factor for increasing a magnitude of a signal output from at least one of a plurality of speakers in the stereo sound system.

According to an embodiment, the absolute value of the sound zooming factor may be determined in proportion to the absolute value of the difference (d–a). However, when the difference (d–a) has a negative value, the sound zooming factor producing module 170 may determine that the current frame tends to retreat from the camera compared to the previous frame.

Then, the sound zooming factor producing module 170 may produce a sound zooming factor for reducing a magnitude of a signal output from at least one of the plurality of speakers in the stereo sound system.

According to an embodiment, the absolute value of the sound zooming factor may be determined in proportion to the absolute value of the difference (d–a). The sound zooming factor producing module 170 may select a speaker to which the produced sound zooming factor is to apply in consideration of at least one of an x-axis coordinate (x) corresponding to the maximum summed depth value along the y-axis direction in the previous frame and an x-axis coordinate (x') corresponding to the maximum summed depth value along the y-axis direction in the current frame. FIGS. 14A and 14B are views for describing a method of applying a sound zooming factor by the stereo sound generating method shown in FIG. 13.

In a 5.1 channel sound system as shown in FIG. 14A, the sound zooming factor producing module 170 may apply a produced sound zooming factor to at least one of a group of a left and front speaker and a left and rear speaker, a group of a central speaker and a woofer, and a group of a right and front speaker and a right and rear speaker based on at least one of coordinates (x and x') corresponding to the maximum summed depth values along the y-axis direction.

Referring back to FIG. 13, the sound zooming factor producing module 170 calculates a summed depth value by summing depth values for pixels in each pixel line along the x-axis direction in the previous and current frames. Then, the sound zooming factor producing module 170 produces a sound zooming factor in consideration of a difference (f–b) between the maximum summed depth value (f) along the x-axis direction in the current frame and the maximum summed depth value (b) along the y-axis direction in the previous frame.

The difference (f–a) between the maximum summed depth values may express a change in a depth value of the current frame with respect to the previous frame. For example, when the difference (f–a) has a positive value, the sound zooming factor producing module 170 determines that the current frame tends to approach the camera compared to the previous frame.

Then, the sound zooming factor producing module 170 may produce a sound zooming factor for increasing a magnitude of a signal output from at least one of a plurality of speakers in the stereo sound system.

According to an embodiment, the absolute value of the sound zooming factor may be determined in proportion to the absolute value of the difference (f–a). However, when the difference (f–a) has a negative value, the sound zooming factor producing module 170 may determine that the current frame tends to retreat from the camera compared to the previous frame.

Then, the sound zooming factor producing module 170 may produce a sound zooming factor for reducing a magnitude of a signal output from at least one of the plurality of speakers in the stereo sound system.

According to an embodiment, the absolute value of the sound zooming factor may be determined in proportion to the absolute value of the difference (f–a). The sound zooming factor producing module 170 may select a speaker to which the produced sound zooming factor is to apply in consideration of at least one of a y-axis coordinate (y) corresponding to the maximum summed depth value along the x-axis direction in the previous frame and a y-axis coordinate (y') corresponding to the maximum summed depth value along the x-axis direction in the current frame.

According to an embodiment, the sound zooming factor producing module 170 may produce a sound zooming factor by reflecting changes in maximum summed depth values along the x- and y-axis directions in the depth maps for the previous and current frames.

According to an embodiment, the sound zooming factor producing module 170 may select a speaker to which a produced sound zooming factor is to apply among a plurality of speakers in the stereo sound system by applying at least one of the above extracted coordinates x and x' and at least one of the above extracted coordinates y and y'.

In a channel sound system including a plurality of speakers arranged in a 3×3 matrix as shown in FIG. 14B, the sound zooming factor producing module 170 may select at least one speaker to which the produced zooming factor is to apply among the nine speakers.

Figure 15:
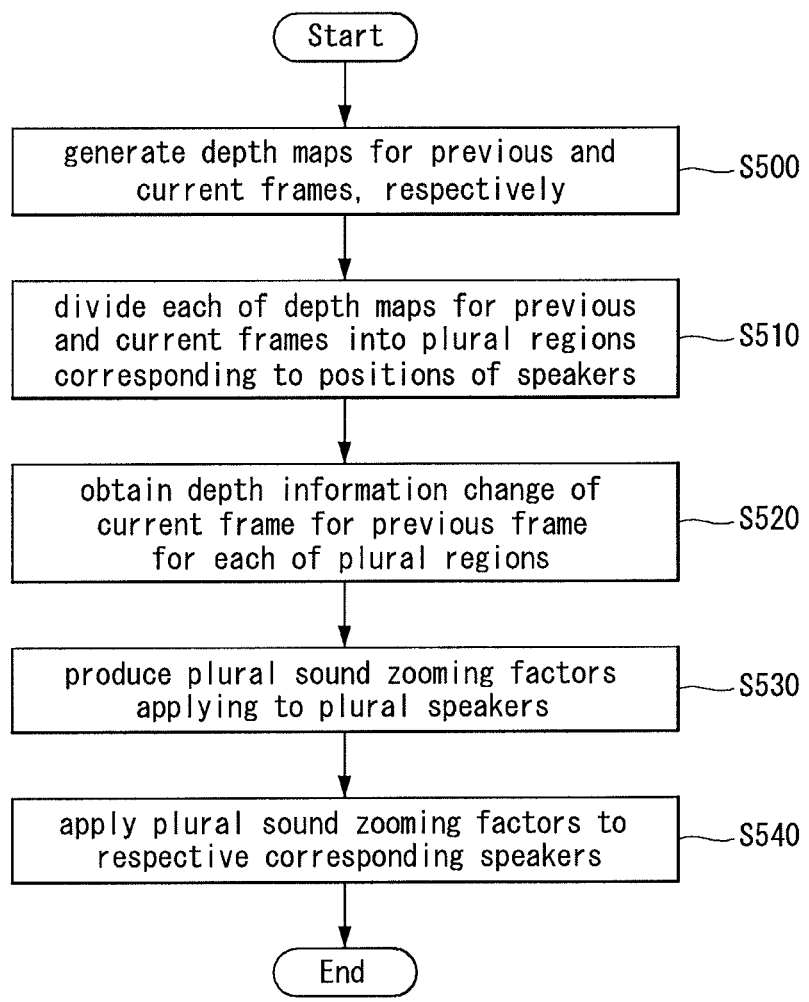
FIG. 15 is a flowchart illustrating an example of the stereo sound generating method shown in FIG. 6.

FIG. 15 is a flowchart illustrating an example of the stereo sound generating method shown in FIG. 6. Hereinafter, the stereo sound generating method is described with reference to relevant drawings. The depth map generating module 160 generates a depth map for each of previous and current frames (S500).

Then, the sound zooming factor producing module 170 divides the depth map for each of the previous and current frames into a plurality of regions corresponding to a plurality of speakers in a stereo sound system (S510). Thereafter, for each of the plurality of regions, the sound zooming factor producing module 170 obtains a change in depth information of the current frame with respect to the previous frame (S520), and based on the obtained change in depth information for each of the plurality of regions, produces a plurality of sound zooming factors that apply to the plurality of speakers (S530).

The produced sound zooming factors are output to the audio processing module 180. Then, the audio processing module 180 applies each of the sound zooming factors to a sound signal output from a corresponding speaker of the plurality of speakers (S540).

Figure 16:
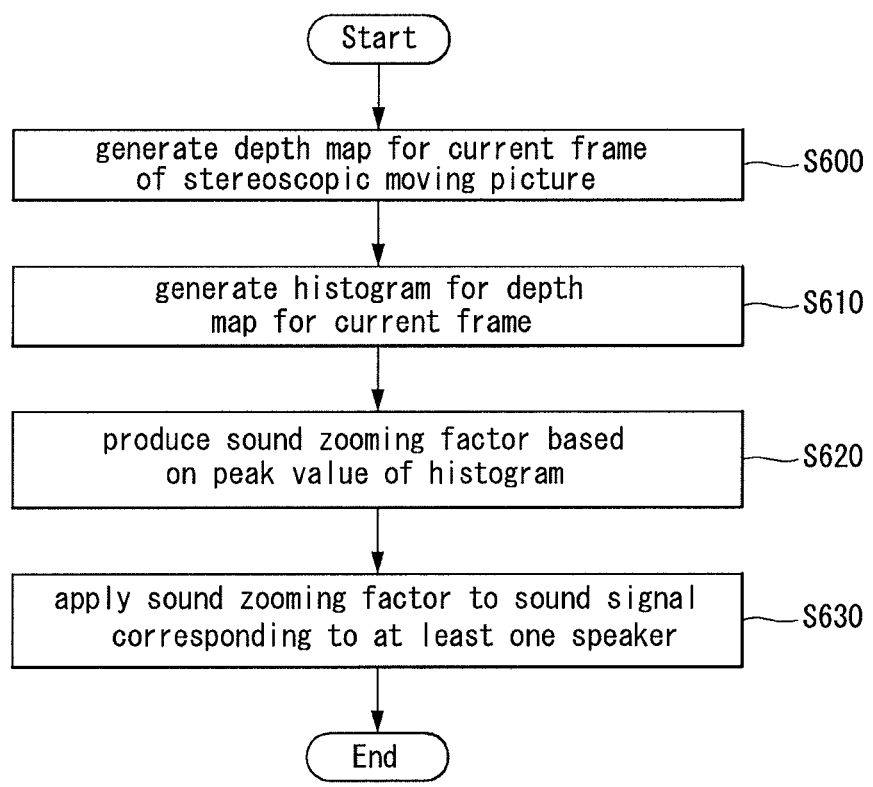
FIG. 16 is a flowchart illustrating a method of generating stereo sound synchronized with a stereo moving picture by an electronic device according to an embodiment of the present invention.

FIG. 16 is a flowchart illustrating a method of generating stereo sound synchronized with a stereo moving picture by an electronic device according to an embodiment of the present invention.

Hereinafter, the stereo sound generating method is described with reference to relevant drawings. The depth map generating module 160 generates a depth map for a current frame in a stereoscopic moving picture (S600).

Then, the sound zooming factor producing module 170 generates a histogram for the depth map for the current frame (S610). When the histogram for the depth map for the current frame is generated, the sound zooming factor producing module 170 produces a sound zooming factor based on a peak value in the histogram (S620).

In the histogram, the peak value represents how much an object positioned closest to the camera occupies the screen.

As a consequence, a sound zooming factor produced based on the peak value of the histogram is a parameter that may provide a different sound effect depending on a size of a region in the screen. When the sound zooming factor is produced, the audio processing module 180 applies the sound zooming factor to a sound signal corresponding to at least one speaker of a plurality of speakers in the stereo sound system and outputs a resultant signal (S630).

Figure 17:
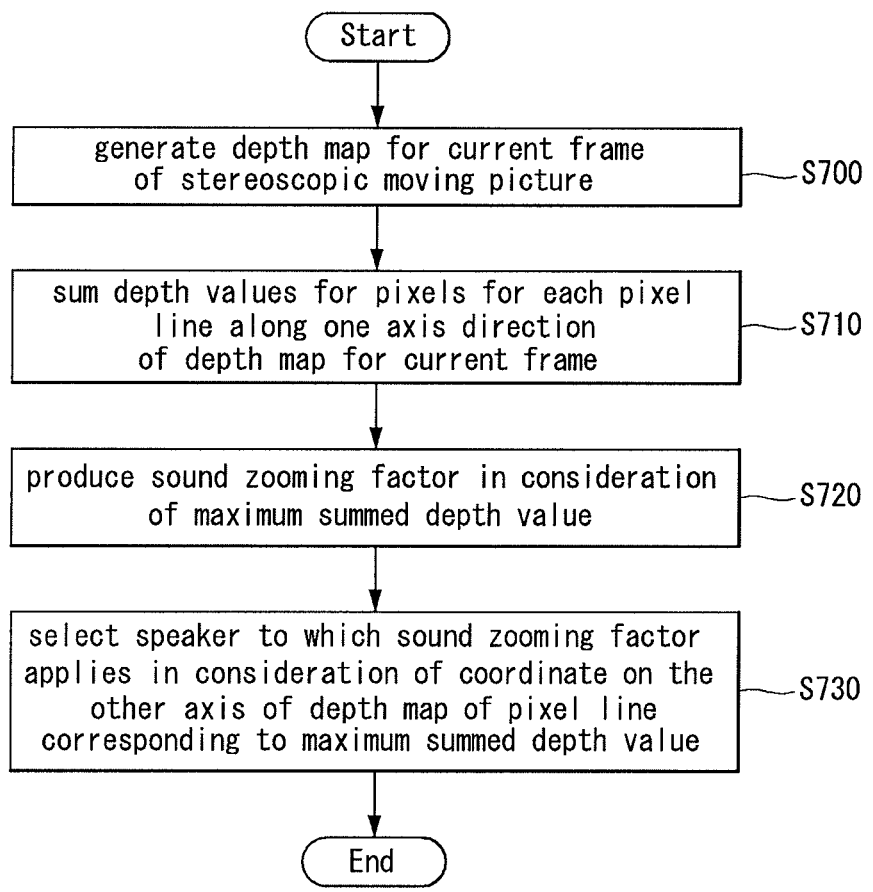
FIG. 17 is a flowchart illustrating a method of generating stereo sound synchronized with a stereoscopic moving picture by an electronic device according to an embodiment of the present invention.

FIG. 17 is a flowchart illustrating a method of generating stereo sound synchronized with a stereoscopic moving picture by an electronic device according to an embodiment of the present invention.

Hereinafter, the stereo sound generating method is described with reference to relevant drawings. The depth map generating module 160 generates a depth map for a current frame in a stereoscopic moving picture (S700).

Then, the sound zooming factor producing module 170 sums depth values for pixels in each pixel line along an axis direction in the depth map for the current frame (S710). Thereafter, the sound zooming factor producing module 170 selects a pixel line having a maximum summed depth value among pixel lines in the current frame and produces a sound zooming factor in consideration of the maximum summed depth value for the current frame (S720).

A point having the maximum summed depth value in the pixel line refers to a point to which an object belongs which is positioned closest to the camera.

Figure 18:
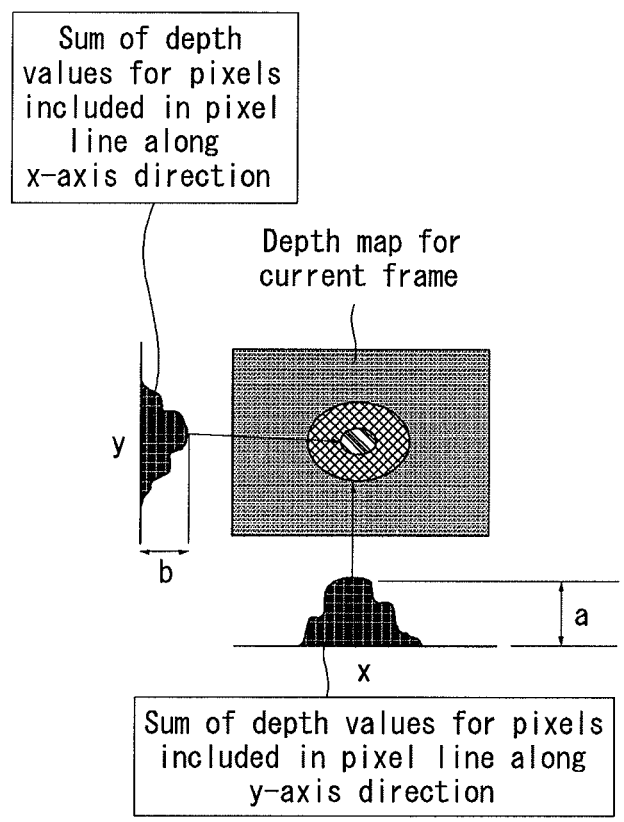
FIG. 18 is a view for describing the stereo sound generating method shown in FIG. 17.

Thus, the stereo sound generating method shown in FIG. 17 is based on a depth value of the object positioned closest to the camera. When the sound zooming factor is produced, the sound zooming factor producing module 170 may select a speaker to which the sound zooming factor is to apply in consideration of a coordinate on the other axis in the depth map for the pixel line corresponding to the maximum summed depth value for the current frame (S730). FIG. 18 is a view for describing the stereo sound generating method shown in FIG. 17.

Hereinafter, the stereo sound generating method shown in FIG. 17 is described with reference to FIG. 18. Referring to FIG. 18, the sound zooming factor producing module 170 may calculate a summed depth value by summing depth values for pixels in each of pixel lines along the y-axis direction in the depth map for the current frame.

The sound zooming factor producing module 170 calculates a summed depth value by summing depth values for pixels in each of pixel lines along the x-axis direction in the depth map for the current frame. The sound zooming factor producing module 170 may produce a sound zooming factor based on at least one of a maximum summed depth value (b) corresponding to the x-axis direction (simply referred to as "maximum summed depth value (b)) and a maximum summed depth value (a) corresponding to the y-axis direction (simply referred to as "maximum summed depth value (a)).

When the maximum summed depth values (a) and (b) are both used for producing a sound zooming factor, the sound zooming factor producing module 170 may produce a sound zooming factor by adding a value obtained by multiplying the maximum summed depth value (a) by a first weight value to a value obtained by multiplying the maximum summed depth value (b) by a second weight value, wherein the first weight value is different from the second weight value. The sound zooming factor producing module 170 may select a speaker to which the produced sound zooming factor is to apply in consideration of at least one of an x-axis coordinate (x) corresponding to the maximum summed depth value (a) for the current frame and a y-axis coordinate (y) corresponding to the maximum summed depth value (b) for the current frame.

A method of the sound zooming factor producing module 170 selecting a speaker to which the sound zooming factor is to apply is apparent from those described in connection with FIGS. 12 to 14, and thus, the detailed description is omitted.

Figure 19:
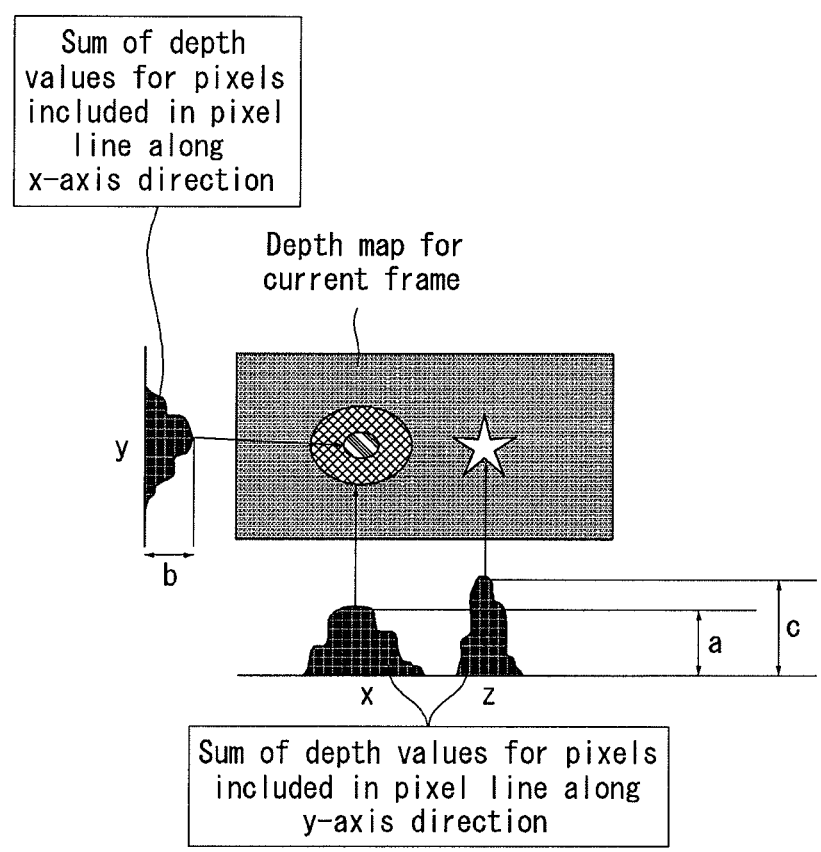
FIG. 19 is a view illustrating a method of generating stereo sound synchronized with a stereoscopic moving picture by an electronic device according to an embodiment of the present invention.

FIG. 19 is a view illustrating a method of generating stereo sound synchronized with a stereoscopic moving picture by an electronic device according to an embodiment of the present invention.

Referring to FIG. 19, a graph for a summed depth value calculated by summing depth values for pixels in each of pixel lines along the y-axis direction in a depth map for a current frame as shown in FIG. 19 has two maximum values. The sound zooming factor producing module 170 may produce a sound zooming factor based on at least one of summed depth values (a and c) corresponding to the two maximum values, respectively.

According to an embodiment, the sound zooming factor producing module 170 may produce a sound zooming factor using only the larger maximum value (c) of the two maximum values (a and c). According to an embodiment, the sound zooming factor producing module 170 may produce a sound zooming factor based on a maximum summed depth value (b) corresponding to pixel lines along the x-axis direction in the current frame.

The sound zooming factor producing module 170 may select a speaker to which the produced sound zooming factor is to apply in consideration of at least one of x-axis coordinates (x and z) corresponding to the maximum values (a and c) among maximum summed depth values along the y-axis direction in the current frame and a y-axis coordinate (y) corresponding to the maximum summed depth value (b) along the x-axis direction in the current frame.

A method of the sound zooming factor producing module 170 selecting a speaker to which the sound zooming factor is to apply is apparent from those described in connection with FIGS. 12 to 14, and thus, the detailed description is omitted.

Figure 20:
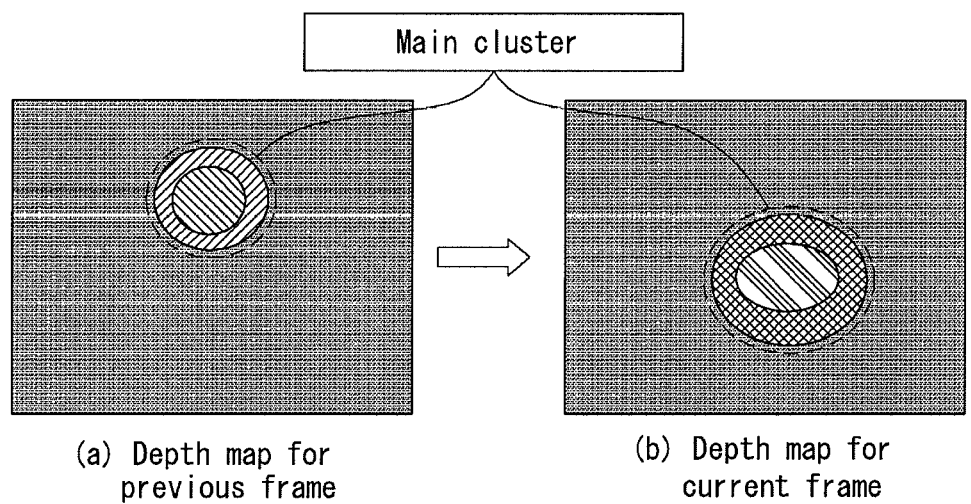
FIGS. 20A and 20B are views illustrating a method of generating stereo sound synchronized with a stereoscopic moving picture by an electronic device according to an embodiment of the present invention.

FIGS. 20A and 20B are views illustrating a method of generating stereo sound synchronized with a stereoscopic moving picture by an electronic device according to an embodiment of the present invention. Referring to FIG. 20, certain regions in previous and current frames are set as main clusters.

As used herein, the "main cluster" refers to a region in which a predetermined number or more of pixels, each having a predetermined value or more, gather together. The electronic device 100 may produce a sound zooming factor based on at least one of changes in a depth value and an area of the main cluster.

The electronic device 100 may select a speaker to which the produced sound zooming factor is to apply among a plurality of speakers in the stereo sound system based on a change in a position of the main cluster.

Figure 21:
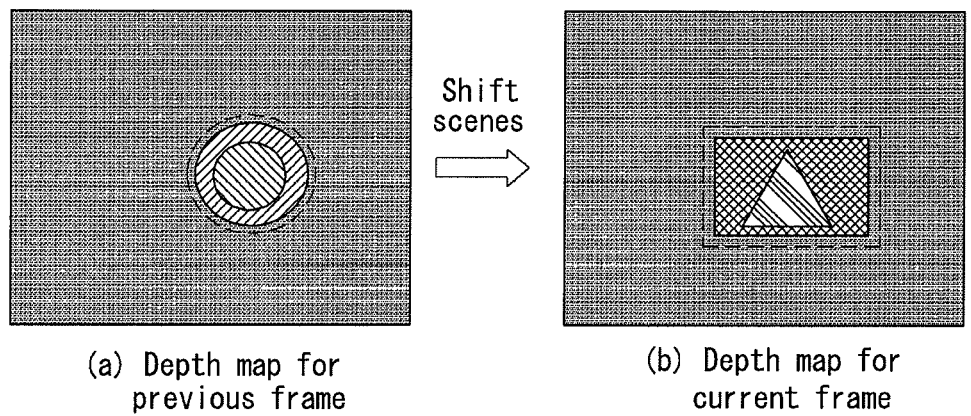
FIGS. 21 and 22 illustrate examples of frames exceptionally processed in a stereo sound generating method performed by an electronic device according to an embodiment of the present invention.
Figure 22:
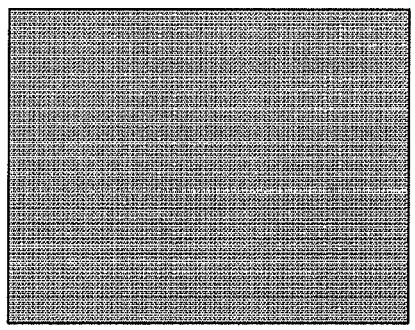
Figure 22:
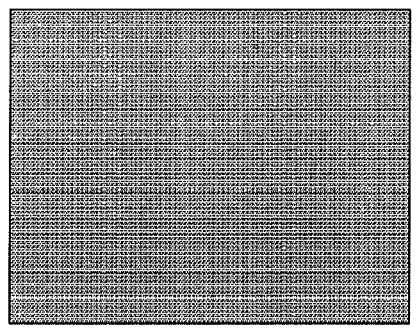

FIGS. 21 and 22 illustrate examples of frames exceptionally processed in a stereo sound generating method performed by an electronic device according to an embodiment of the present invention. Referring to FIG. 21, a shape on a depth map shown in FIG. 21A is greatly changed to a shape on a depth map shown in FIG. 21B.

However, the depth maps respectively shown in FIGS. 21A and 21B have substantially the same area that corresponds to locations and specific depth values of the shapes, and thus, histograms for the two depth maps may be similar to each other. Such phenomenon primarily occurs when a stereoscopic moving picture changes scenes.

According to an embodiment, the electronic device 100 may not produce a sound zooming factor exceptionally when the stereoscopic moving picture changes scenes.

For example, when determining that there is no continuity between a previous frame and a current frame like when the scenes change, the electronic device 100 may inactivate a function of producing a sound zooming factor. According to an embodiment, as shown in FIG. 22, the electronic device 100 may not produce a sound zooming factor when in a stereoscopic moving picture a left image and a right image both have a monochromic screen.

This is because there is no object to provide a feeling of distance in the stereoscopic moving picture. According to an embodiment, the electronic device 100 may not produce a sound zooming factor when a foggy or dark scene is present—for example, when a depth value in a depth map for the stereoscopic moving picture appears to be not more than a critical value.

According to an embodiment, the electronic device 100 may not produce a sound zooming factor when various predetermined depth maps exhibit unique distributions.

FIGS. 23A and 23B are view illustrating a method of generating stereo sound by an electronic device according to an embodiment of the present invention.

Figure 23:
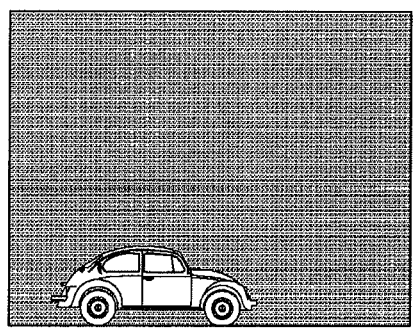
FIG. 23 illustrates a process of generating depth information corresponding to depth information extractable from left and right images of a 3D image based on a 2D image and producing a sound zooming factor based on the generated depth information.
Figure 23:
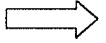
Figure 23:
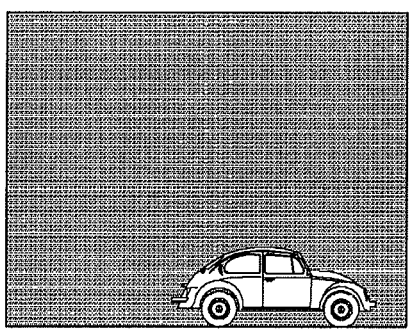

FIG. 23 illustrates a process of generating depth information corresponding to depth information extractable from left and right images of a 3D image based on a 2D image and producing a sound zooming factor based on the generated depth information. As shown in FIG. 23, when an object included in the 2D image horizontally moves from left to right, the electronic device 100 may generate a depth map assuming that a previous frame is the left image in a stereoscopic moving picture and a current frame is the right image in the stereoscopic moving picture.

The produced depth map may be used for the various methods of producing a sound zooming factor as described above. When the object moves changing its size in the 2D image, the electronic device 100 may produce more accurate depth information using SIFT (Scale Invariant Feature Transform). Accordingly, it may be possible to more precisely produce a sound zooming factor.

Figure 24:
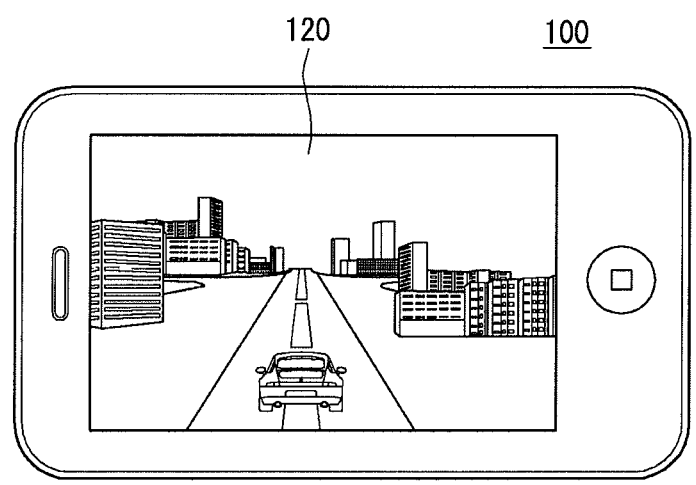
FIG. 24 is a view illustrating a method of generating stereo sound by an electronic device according to an embodiment of the present invention.

FIG. 24 is a view illustrating a method of generating stereo sound by an electronic device according to an embodiment of the present invention.

For purposes of illustration, the electronic device 100 provides a 2D image and previously stores depth information matched to the 2D image. For example, in a 2D car racing game as shown in FIG. 24, depth information corresponding to an image provided to a user may be previously stored in the electronic device 100.

Then, the electronic device 100 may produce a sound zooming factor using the depth information previously stored in the electronic device 100. Each of the methods of producing a sound zooming factor and methods of applying the sound zooming factor by the electronic device 100 may be implemented in the form of a program executable by various computing means and may recorded in a computer readable medium.

The computer readable medium may include program commands, data files, data structures, or combinations thereof.

The program recorded in the medium may be specifically designed and configured for the embodiments of the present invention or may be known to those skilled in the computer software art. Examples of the computer readable recording medium include hard discs, floppy discs, magnetic media, such as magnetic tapes, optical media, such as CD-ROMs and DVDs, magneto-optical media, such as floptical discs, ROMs, RAMs, flash memories, or any other means that are configured to store and execute program commands.

Examples of the program include high class language codes executable by computers using an interpreter as well as machine language codes, such as those made by a compiler.

The above mentioned hardware devices may be configured in one or more software modules to perform the operation according to the embodiments of the present invention and vice versa.

The embodiments of the invention have been described above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. An electronic device, comprising:
   a receiver configured to receive a stereoscopic moving image including a plurality of frames;
   a controller configured to:
   obtain a change in depth information of at least one object included in the stereoscopic moving image,
   calculate a summed depth value by summing depth values for a plurality of pixels in each of a plurality of pixel lines along a first axis direction in each of depth maps for previous and current frames, and
   produce a sound zooming factor in consideration of a difference between a maximum summed depth value for the current frame and a maximum summed depth value for the previous frame in the first axis direction; and
   an audio processor configured to apply the produced sound zooming factor to a sound signal corresponding to at least one speaker of a plurality of speakers outputting sound signals for the stereoscopic moving image.

2. The electronic device of claim 1, wherein the controller is further configured to obtain the change in depth information based on a depth map for the previous frame and a depth map for the current frame among the plurality of frames included in the stereoscopic moving image.

3. The electronic device of claim 2, wherein the controller is further configured to obtain the change in depth information based on the depth maps themselves for the previous and current frames or first generate histograms for the depth maps for the previous and current frames and then obtain the change in the depth information based on the generated histograms.

4. The electronic device of claim 3, wherein the controller is further configured to obtain the change in depth information of the current frame with respect to the previous frame based on a shift of a peak point of the second histogram with respect to a peak point of the first histogram, or to obtain the change in depth information of the current frame with respect to the previous frame based on a value obtained by subtracting a gray level value of the first histogram from a gray level value of the second histogram.

5. The electronic device of claim 2, wherein the controller is further configured to divide each of the depth maps for the previous and current frames into a plurality of regions corresponding to positions of the plurality of speakers, to obtain a change in depth information for each of the plurality of regions, and to select a speaker to which the produced sound zooming factor applies based on the change in depth information for each of the plurality of regions.

6. The electronic device of claim 2, wherein the controller is further configured to divide each of the depth maps for the previous and current frames into a plurality of regions corresponding to positions of the plurality of speakers, to obtain a change in depth information for each of the plurality of regions, to produce a plurality of sound zooming factors which apply to the plurality of speakers based on the change in depth information for each of the plurality of regions, and to apply each of the produced sound zooming factors to a sound signal output from a corresponding speaker.

7. The electronic device of claim 6, wherein the controller is further configured not to produce a sound zooming factor for a region of the plurality of regions, in which the change in depth information of the current frame with respect to the previous frame has a value smaller than a predetermined threshold.

8. The electronic device of claim 1, wherein the controller is further configured to calculate another summed depth value by summing a plurality of pixels in each of a plurality of pixel lines along a second axis direction in each of the depth maps for the previous and current frames, and to produce the sound zooming factor further in consideration of a difference between a maximum summed depth value for the current frame and a maximum summed depth value for the previous frame in the second axis direction.

9. The electronic device of claim 8, wherein the controller is further configured to select a speaker to which the produced sound zooming factor applies in consideration of a coordinate on the second axis in the depth map for a pixel line corresponding to at least one of the maximum summed depth value for the depth map for the previous frame and the maximum summed depth value for the depth map for the current frame with respect to the first axis in the depth map.

10. The electronic device of claim 9, wherein the controller is further configured to select a speaker to which the produced sound zooming factor applies further in consideration of a coordinate on the first axis in the depth map for a pixel line corresponding to at least one of the maximum summed depth value for the depth map for the previous frame and the maximum summed depth value for the depth map for the current frame with the second axis in the depth map.

11. The electronic device of claim 1, wherein the controller is further configured to generate the depth map for the previous frame and the depth map for the current frame based on left and right images in the stereoscopic moving image.

12. An electronic device comprising:
a receiver configured to receive a stereoscopic moving picture including a plurality of frames;
a controller configured to:
generate a histogram for a depth map for a current frame in the stereoscopic moving picture,
calculate a depth value of the histogram by summing depth values for a plurality of pixels in each of a plurality of pixel lines along a first axis direction in each of depth maps for previous and current frames, and produce a sound zooming factor in consideration of a difference by subtracting a gray level corresponding to a peak point in the histogram for a previous frame from a gray level corresponding to a peak point in the histogram for a current frame; and
an audio processor configured to apply the produced sound zooming factor to a sound signal corresponding to at least one speaker of a plurality of speakers outputting sound signals for the stereoscopic moving picture.

13. The electronic device of claim 12, wherein the controller is further configured to generate the depth map for the current frame based on left and right images in the stereoscopic moving picture.

14. The electronic device of claim 12, wherein the controller is further configured to divide the depth map for the current frame into a plurality of regions corresponding to positions of the plurality of speakers and to select a speaker to which the produced sound zooming factor applies based on depth information for each of the plurality of regions.

15. An electronic device comprising:
a receiver configured to receive a stereoscopic moving picture including a plurality of frames;
a controller configured to calculate a summed depth value by summing depth values for a plurality of pixels in each of a plurality of pixel lines along a first axis direction in a depth map for a current frame, and to produce a sound zooming factor in consideration of a maximum summed depth value for the current frame in the first axis direction of the depth map; and
an audio processor configured to apply the produced sound zooming factor to a sound signal corresponding to at least one speaker of a plurality of speakers outputting sound signals for the stereoscopic moving picture.

16. The electronic device of claim 15, wherein the controller is further configured to generate the depth map for the current frame based on left and right images in the stereoscopic moving picture.

17. The electronic device of claim 15, wherein the controller is further configured to calculate another summed depth value by summing a plurality of pixels in each of the plurality of pixel lines along a second axis direction in the depth map for the current frame, and to produce the sound zooming factor further in consideration of a difference of a maximum summed depth value for the current frame in the second axis direction in the depth map.

18. The electronic device of claim 17, wherein the controller is further configured to select a speaker to which the produced sound zooming factor applies in consideration of a coordinate on the second axis of the depth map for a pixel line corresponding to the maximum summed depth value of the depth map for the current frame in the first axis direction in the depth map.

19. The electronic device of claim 18, wherein the controller is further configured to select a speaker to which the produced sound zooming factor applies in consideration of a coordinate on the first axis of the depth map for a pixel line corresponding to the maximum summed depth value of the depth map for the current frame in the second axis direction in the depth map.

* * * * *